United States Patent
Skourtis et al.

(10) Patent No.: US 11,341,281 B2
(45) Date of Patent: May 24, 2022

(54) PROVIDING DIFFERENTIAL PRIVACY IN AN UNTRUSTED ENVIRONMENT

(71) Applicant: International Business Machines Corporation, Armonk, NY (US)

(72) Inventors: Dimitrios Skourtis, Santa Cruz, CA (US); Deepavali M. Bhagwat, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 16/132,248

(22) Filed: Sep. 14, 2018

(65) Prior Publication Data

US 2020/0089917 A1    Mar. 19, 2020

(51) Int. Cl.
*G06F 21/74* (2013.01)
*H04L 9/00* (2022.01)
*G06F 21/76* (2013.01)

(52) U.S. Cl.
CPC ............ *G06F 21/74* (2013.01); *G06F 21/76* (2013.01); *H04L 9/008* (2013.01)

(58) Field of Classification Search
CPC ......... G06F 21/74; G06F 21/76; H04L 19/008
See application file for complete search history.

(56) References Cited

U.S. PATENT DOCUMENTS

| | | | |
|---|---|---|---|
| 7,260,215 B2 | 8/2007 | Troyansky et al. | |
| 9,716,590 B2 * | 7/2017 | Gentry | H04L 9/008 |
| 9,819,650 B2 | 11/2017 | Soon-Shiong et al. | |
| 9,838,367 B2 * | 12/2017 | Chhabra | G06F 21/74 |
| 10,073,981 B2 * | 9/2018 | Arasu | G06F 21/62 |
| 10,440,096 B2 * | 10/2019 | Sabella | H04W 28/0205 |
| 10,671,737 B2 * | 6/2020 | Durham | G06F 21/57 |
| 10,742,393 B2 * | 8/2020 | Wooden | H04L 63/04 |
| 10,778,633 B2 * | 9/2020 | Friedman | G06F 16/35 |
| 10,977,384 B2 * | 4/2021 | Benaloh | H04L 9/3239 |
| 11,119,824 B2 * | 9/2021 | Clampitt, III | G06Q 10/06 |
| 11,165,565 B2 * | 11/2021 | Belenko | H04L 63/166 |
| 2016/0283731 A1 * | 9/2016 | Chow | G06F 21/6263 |
| 2016/0380985 A1 * | 12/2016 | Chhabra | H04L 63/0876 |
| | | | 713/171 |
| 2017/0177505 A1 * | 6/2017 | Basak | G06F 3/0673 |
| 2017/0180115 A1 * | 6/2017 | Laine | H04L 9/0618 |
| 2018/0005186 A1 | 1/2018 | Hunn | |
| 2018/0136943 A1 * | 5/2018 | Chew | G06F 1/24 |
| 2018/0167203 A1 * | 6/2018 | Belenko | H04L 63/0435 |

(Continued)

OTHER PUBLICATIONS

Pagano, F., "A Distributed Approach to Privacy on the Cloud," PhD Thesis in Computer Science at University of Milan, Italy, 2010/2011, 173 pages, retrieved from https://arxiv.org/abs/1503.08115.

(Continued)

*Primary Examiner* — Viral S Lakhia
(74) *Attorney, Agent, or Firm* — Zilka-Kotab, P.C.

(57) ABSTRACT

A computer-implemented method according to one embodiment includes obtaining, at an untrusted environment, encrypted data from a storage location, initiating, within the untrusted environment, a performance of one or more secure computations on the encrypted data, and providing, within the untrusted environment, results of performing the one or more secure computations on the encrypted data.

20 Claims, 9 Drawing Sheets

(56) References Cited

U.S. PATENT DOCUMENTS

| | | | |
|---|---|---|---|
| 2018/0205553 A1* | 7/2018 | Hoppert | G06F 21/12 |
| 2019/0065775 A1* | 2/2019 | Klucar, Jr. | G06F 16/24554 |
| 2019/0102577 A1* | 4/2019 | Gueron | G06F 12/1466 |
| 2019/0147188 A1* | 5/2019 | Benaloh | H04L 63/0442 726/26 |
| 2019/0244138 A1* | 8/2019 | Bhowmick | H04L 9/008 |
| 2019/0278913 A1* | 9/2019 | Ndu | G06F 21/575 |

OTHER PUBLICATIONS

Arasu et al., "Querying Encrypted Data," Microsoft Research, Proceedings of the ACM SIGMOD International Conference on Management of Data, 2014, 140 pages.

Vaughan, J., "Aura: Programming with Authorization and Audit," University of Pennsylvania ScholarlyCommons, Publicly Accessible Penn Dissertations, Dec. 22, 2009, 208 pages.

Jayaram et al., "Trustworthy Geographically Fenced Hybrid Clouds," Proceedings of the 15th International Middleware Conference, 2014, pp. 37-48.

Beckert et al., "Software Security in Virtualized Infrastructures The Smart Meter Example," Karlsruhe Reports in Informatics, 2010, 26 pages.

Oliveira Brito, T., "Darkroom The Use of ARM TrustZone for Secure Data Processing on the Cloud," Thesis, Tecnico Lisboa, Oct. 2016, 90 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Abadi et al., "Deep Learning with Differential Privacy," preprint to appear in 23rd ACM Conference on Computer and Communications Security, Oct. 2016, pp. 1-14, retrieved from https://arxiv.org/pdf/1607.00133.pdf.

Arnautov et al., "SCONE: Secure Linux Containers with Intel SGX," Proceedings of the 12th USENIX Symposium on Operating Systems Design and Implementation (OSDI '16), Nov. 2016, pp. 689-703.

Bassily et al., "Private Empirical Risk Minimization: Efficient Algorithms and Tight Error Bounds," IEEE Annual Symposium on Foundations of Computer Science, 2014, pp. 464-473.

Baumann et al., "Shielding Applications from an Untrusted Cloud with Haven," Proceedings of the 11th USENIX Symposium on Operating Systems Design and Implementation, Oct. 2014, pp. 267-283.

Boehm et al., "SystemML: Declarative Machine Learning on Spark," Proceedings of the VLDB Endowment, vol. 9, No. 13, 2016, pp. 1425-1436.

Fiore et al., "Efficiently Verifiable Computation on Encrypted Data," Proceedings of ACM CCS, 2014, pp. 1-44.

Fredrikson et al., "Model Inversion Attacks that Exploit Confidence Information and Basic Countermeasures," ACM SIGSAC Conference on Computer and Communications Security, 2015, 12 pages.

Friedman et al., "Data Mining with Differential Privacy," Proceedings of the 16th ACM SIGKDD International conference on Knowledge Discovery and Data Mining, Jul. 2010, 10 pages.

Gennaro et al., "Non-interactive Verifiable Computing: Outsourcing Computation to Untrusted Workers," CRYPTO, 2010, pp. 465-482.

Ghodsi et al., "SafetyNets: Verifiable Execution of Deep Neural Networks on an Untrusted Cloud," arXiv, 2017, pp. 1-10, retrieved from https://arxiv.org/pdf/1706.10268.pdf.

Dowlin et al., "CryptoNets: Applying Neural Networks to Encrypted Data with High Throughput and Accuracy," Proceedings of the 33rd International Conference on Machine Learning, 2016, 10 pages.

Hunt et al., "Ryoan: A Distributed Sandbox for Untrusted Computation on Secret Data," Proceedings of the 12th USENIX Symposium on Operating Systems Design and Implementation (OSDI '16), Nov. 2016, pp. 533-549.

Jain et al., "Differentially Private Learning with Kernels," Proceedings of the 30 th International Conference on Machine Learning, 2013, 9 pages.

Ji et al., "Differential Privacy and Machine Learning: a Survey and Review," arXiv, Dec. 2014, pp. 1-30, retrieved from https://arxiv.org/pdf/1412.7584.pdf.

Jia et al., "Caffe: Convolutional Architecturefor Fast Feature Embedding," Proceedings of the 22nd ACM International Conference on Multimedia, 2014, 4 pages.

Kapralov et al., "On differentially private low rank approximation," Proceedings of the Twenty-Fourth Annual ACM-SIAM Symposium on Discrete Algorithms, 2012, pp. 1395-1414, retrieved from https://epubs.siam.org/doi/pdf/10.1137/1.9781611973105.101.

Schuster et al., "VC3: Trustworthy Data Analytics in the Cloud using SGX," 2015 IEEE Symposium on Security and Privacy, 2015, pp. 38-54.

Shokri et al., "Privacy-Preserving Deep Learning," Proceedings of the 22nd ACM SIGAC Conference on Computer and Communications Security, Oct. 2015, 12 pages.

Song et al., "Stochastic gradient descent with differentially private updates," IEEE, Global Conference on Signal and Information Processing (GlobalSIP), 2013, pp. 245-248.

Zhang et al., "Functional Mechanism: Regression Analysis under Differential Privacy," Proceedings of the VLDB Endowment, vol. 5, No. 11, 2012, pp. 1364-1375.

Zheng et al., "Opaque: An Oblivious and Encrypted Distributed Analytics Platform," 14th USENIX Symposium on Networked Systems Design and Implementation, 2017, pp. 283-298.

Gentry, C., "Fully Homomorphic Encryption Using Ideal Lattices," ACM, STOC'09, May/Jun. 2009, pp. 169-178.

* cited by examiner

PROVIDING DIFFERENTIAL PRIVACY IN AN UNTRUSTED ENVIRONMENT

BACKGROUND

The present invention relates to data security, and more specifically, this invention relates to providing data privacy guarantees in an untrusted computing environment.

Data scientists process large amounts of data to generate predictive models and to perform analysis. Models and analytic outputs might embed sensitive information, especially in rich models, such as deep learning models. There is therefore a need to provide provable privacy guarantees to machine learning and analytics methods in an efficient manner.

SUMMARY

A computer-implemented method according to one embodiment includes obtaining, at an untrusted environment, encrypted data from a storage location, initiating, within the untrusted environment, a performance of one or more secure computations on the encrypted data, and providing, within the untrusted environment, results of performing the one or more secure computations on the encrypted data.

According to another embodiment, a computer program product for providing differential privacy in an untrusted environment includes a computer readable storage medium having program instructions embodied therewith, where the computer readable storage medium is not a transitory signal per se, and where the program instructions are executable by a processor to cause the processor to perform a method including obtaining, by the processor at an untrusted environment, encrypted data from a storage location, initiating, by the processor within the untrusted environment, a performance of one or more secure computations on the encrypted data, and providing, by the processor within the untrusted environment, results of performing the one or more secure computations on the encrypted data.

A computer-implemented method according to one embodiment includes a processor, and logic integrated with the processor, executable by the processor, or integrated with and executable by the processor, where the logic is configured to obtain, at an untrusted environment, encrypted data from a storage location, initiate, within the untrusted environment, a performance of one or more secure computations on the encrypted data, and provide, within the untrusted environment, results of performing the one or more secure computations on the encrypted data.

Other aspects and embodiments of the present invention will become apparent from the following detailed description, which, when taken in conjunction with the drawings, illustrate by way of example the principles of the invention.

DETAILED DESCRIPTION

Figure 1:
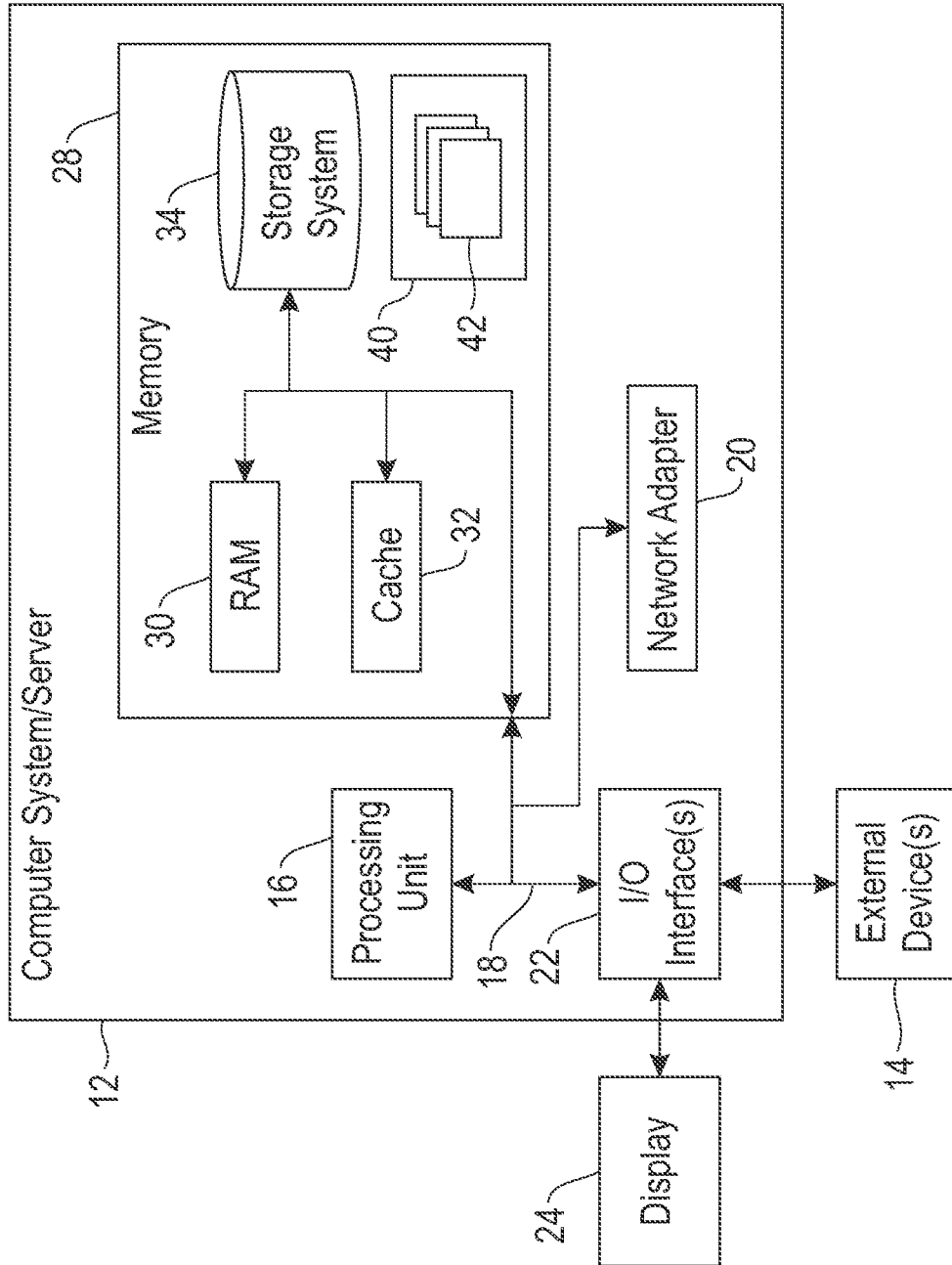
FIG. 1 depicts a cloud computing node according to an embodiment of the present invention.

The following description discloses several preferred embodiments of systems, methods and computer program products for providing differential privacy in an untrusted environment. Various embodiments provide a method for obtaining encrypted data from storage, performing secure computations on the encrypted data, and outputting encrypted results.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing differential privacy in an untrusted environment.

In one general embodiment, a computer-implemented method includes obtaining, at an untrusted environment, encrypted data from a storage location, initiating, within the untrusted environment, a performance of one or more secure computations on the encrypted data, and providing, within the untrusted environment, results of performing the one or more secure computations on the encrypted data.

In another general embodiment, a computer program product for providing differential privacy in an untrusted environment includes a computer readable storage medium having program instructions embodied therewith, where the computer readable storage medium is not a transitory signal per se, and where the program instructions are executable by a processor to cause the processor to perform a method including obtaining, by the processor at an untrusted environment, encrypted data from a storage location, initiating, by the processor within the untrusted environment, a performance of one or more secure computations on the encrypted data, and providing, by the processor within the untrusted environment, results of performing the one or more secure computations on the encrypted data.

In another general embodiment, a computer-implemented method includes a processor, and logic integrated with the processor, executable by the processor, or integrated with and executable by the processor, where the logic is configured to obtain, at an untrusted environment, encrypted data from a storage location, initiate, within the untrusted environment, a performance of one or more secure computations on the encrypted data, and provide, within the untrusted environment, results of performing the one or more secure computations on the encrypted data.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
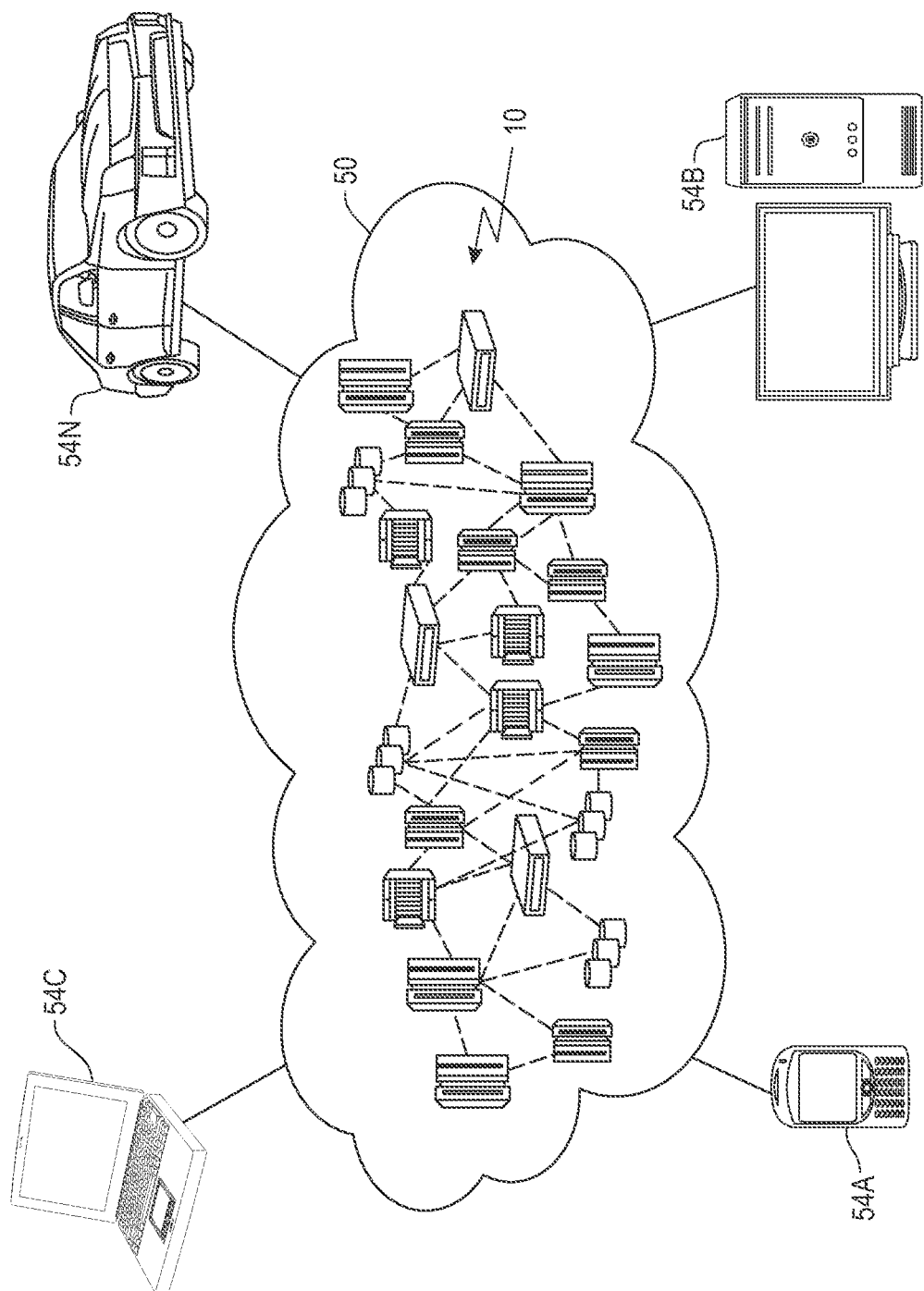
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
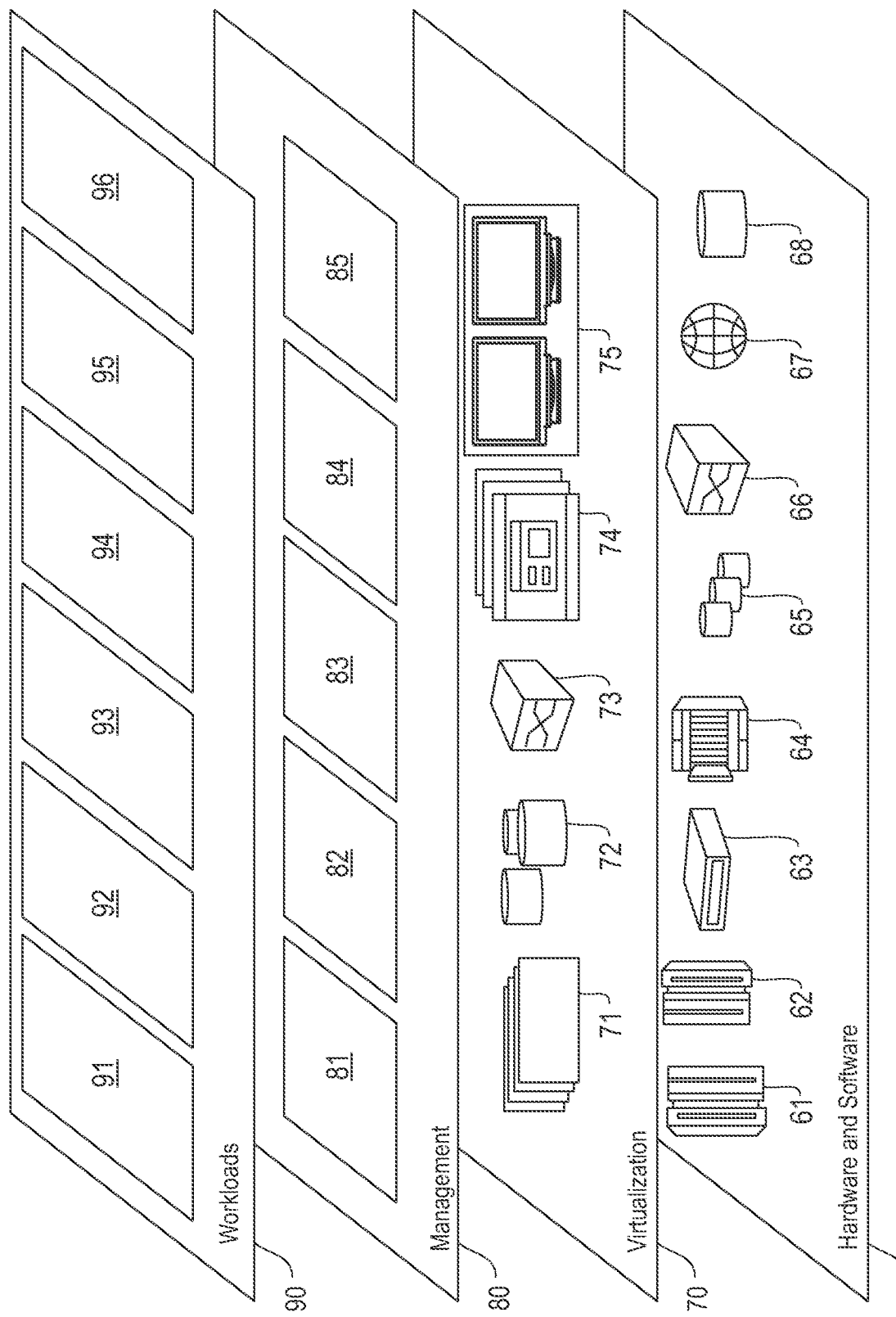
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
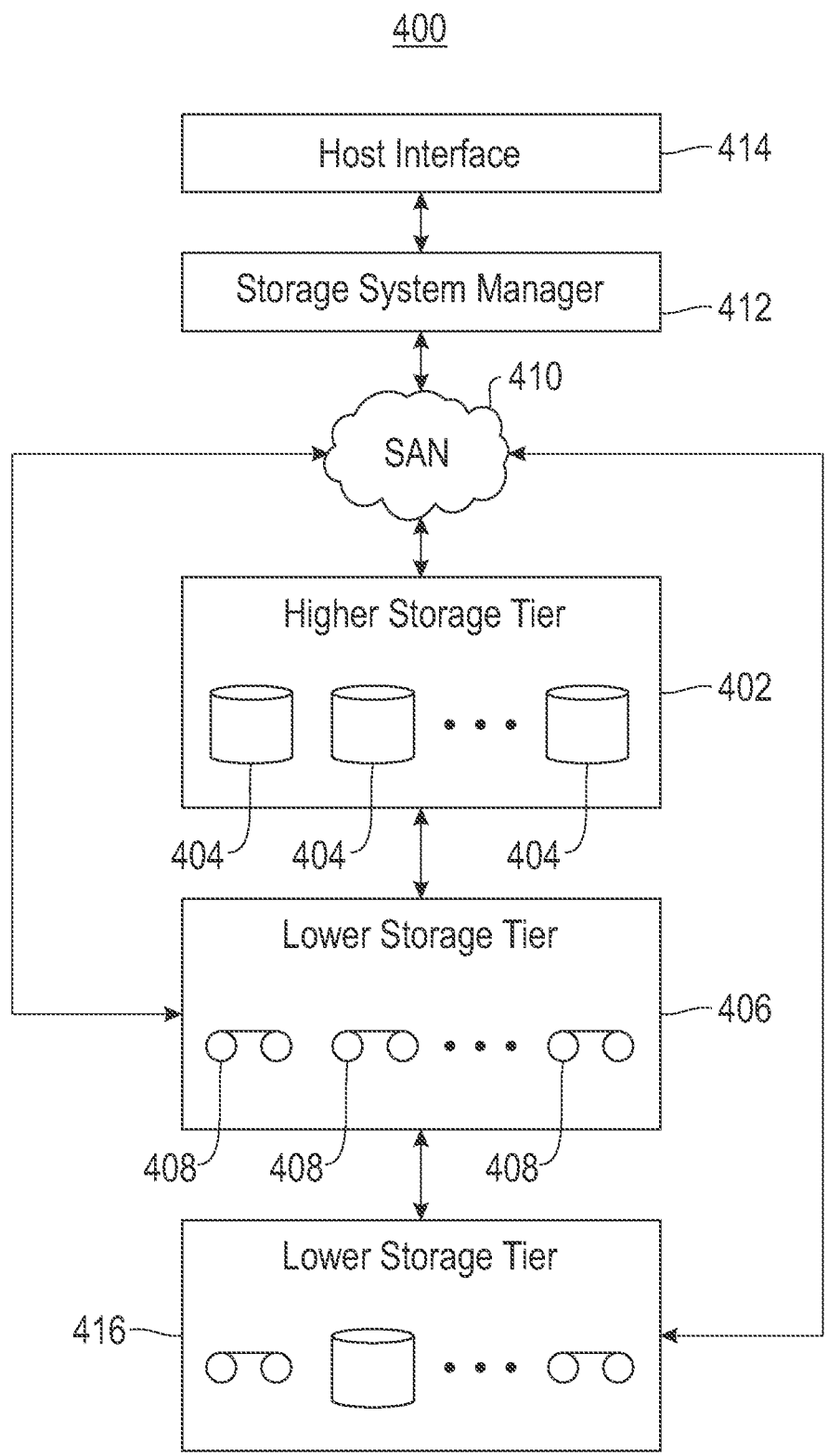
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
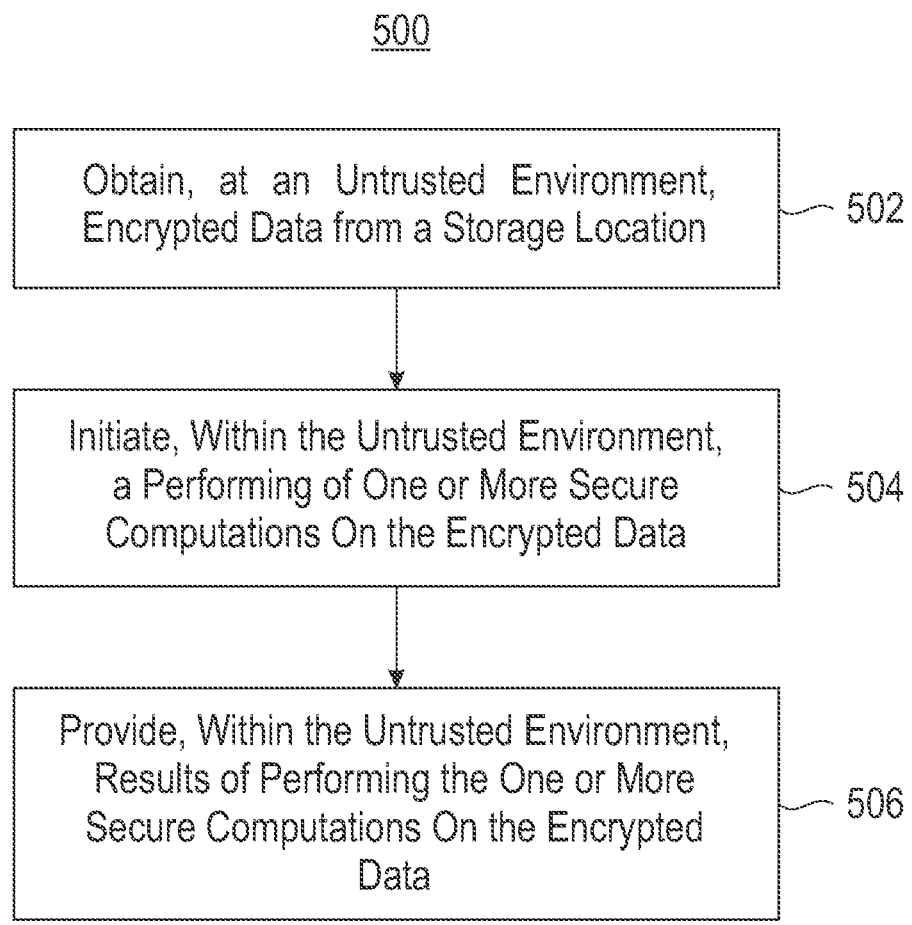
FIG. 5 illustrates a flowchart of a method for providing differential privacy in an untrusted environment, in accordance with one embodiment.

Now referring to FIG. 5, a flowchart of a method 500 is shown according to one embodiment. The method 500 may be performed in accordance with the present invention in any of the environments depicted in FIGS. 1-4 and 9, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where encrypted data is obtained at an untrusted environment from a storage location. In one embodiment, the storage location may include a single storage device, a plurality of networked storage devices, a distributed storage system, etc. In another embodiment, the storage location may be logically and/or physically separate from the untrusted environment.

Additionally, in one embodiment, data may be encrypted at the storage location to create the encrypted data. For example, the encryption may be performed by a storage agent implemented within the storage location. In another example, the encryption may be performed in response to a request for the data sent from the untrusted environment to the storage location. In yet another example, the encryption may be performed utilizing one or more data encryption methods.

Further, in one embodiment, the untrusted environment may include a computing environment. For example, the untrusted environment may include one or more untrusted nodes within a distributed computing environment such as a clustered computing environment. In another example, the untrusted environment may include a cloud computing environment, a mainframe computing device, etc. In yet another embodiment, the untrusted environment may include one or more nodes of an untrusted cluster of nodes specializing in performing data processing.

Further still, in one embodiment, the untrusted environment may include an insecure environment where data security is not guaranteed. In another embodiment, the encrypted data may be obtained by a compute agent implemented within the untrusted environment. For example, the compute agent may receive a request for the data (e.g., from a learning framework, etc.). In another example, the compute agent may encrypt the request for the data and send the encrypted request to a storage agent implemented within the storage location. In yet another example, the compute agent may receive the encrypted data from the storage agent, in response to sending the encrypted request.

Also, method 500 may proceed with operation 504, where a performance of one or more secure computations are initiated on the encrypted data within the untrusted environment. In one embodiment, the one or more secure computations may include one or more analytics operations. For example, the one or more secure computations may include one or more machine learning algorithms, one or more training algorithms, one or more computational algorithms, one or more analytical algorithms, etc. In another embodiment, the one or more secure computations may be selected by a user. For example, the user may request that the one or more computations be applied to the data (e.g., using an interface, etc.).

In addition, in one embodiment, the one or more secure computations may be performed utilizing a CPU enclave. For example, a CPU enclave may include a portion of the CPU that is restricted/trusted. In another example, the CPU may be located within the untrusted environment. In yet another example, the encrypted data may be decrypted within the CPU enclave, and the one or more secure computations may be performed on the decrypted data within the CPU enclave. In still another example, the results of the one or more secure computations may be encrypted within the CPU enclave, and the encrypted results may then be presented by the CPU enclave (e.g., to the compute agent, etc.).

Furthermore, in one embodiment, the one or more secure computations may be performed utilizing a graphics processing unit (GPU) and homomorphic encryption. For example, the data may be encrypted by the storage agent utilizing homomorphic encryption. In another example, a GPU within the untrusted environment may perform the one or more secure computations on this homomorphically encrypted data without performing decryption. In yet another example, the results of the one or more secure computations by the GPU may be homomorphically encrypted as well.

Further still, in one embodiment, the one or more secure computations may be performed utilizing a tensor processing unit (TPU) and/or field-programmable gate array (FPGA) and homomorphic encryption. In another embodiment, the one or more secure computations may be initiated by the compute agent implemented within the untrusted environment. For example, in response to receiving the encrypted data, the compute agent may prepare a secure computational environment within the untrusted environment. In another example, the secure computational environment may include one or more of a CPU enclave and a GPU kernel. In yet another example, the compute agent may select one or more of the CPU enclave and the GPU kernel to perform the one or more secure computations. For instance, the selection may be based on a configuration of a learning framework. In another example, the compute agent may then send the encrypted data to one or more of the CPU enclave and GPU kernel for secure processing.

Also, in one embodiment, differential privacy may be applied during the secure computations. For example, differential privacy may be applied during the performance of the one or more secure computations by the CPU and/or GPU. In another example, differential privacy may be applied once (e.g., to the results of performing the secure computations on the data, etc.). In yet another example, differential privacy may be applied multiple times (e.g., during each of a plurality of computational iterations within a plurality of secure computations, etc.).

Additionally, method 500 may proceed with operation 506, where results of performing the one or more secure computations on the encrypted data are provided within the untrusted environment. In one embodiment, the results may be retrieved by the compute agent implemented within the untrusted environment. For example, the compute agent may retrieve the results from the CPU and/or GPU.

Further, in one embodiment, the results may be encrypted. For example, the CPU may encrypt the results of the one or more secure computations before returning the results. In another example, the GPU may perform the one or more secure computations on homomorphically encrypted data without decrypting the data, such that the results are homomorphically encrypted as well. In another embodiment, the results may be stored within the untrusted environment. For example, the results may be stored in random access memory (RAM) within the untrusted environment.

Further still, in one embodiment, the results may be decrypted in response to a request. For example, the compute agent may decrypt the results in response to a user request. In another example, the decryption of the results may detract from a security budget of the user.

In this way, a security of the data may be maintained from the retrieval of the data, to the performance of computations on the data, to the return of results of the computations. This may maximize data security within an untrusted environment. By maintaining the data as encrypted both before and after performing the computations, the computations may be performed without affecting a security budget of a user requesting the computations. The security budget may only be reduced when decrypted results are specifically requested.

Figure 6:
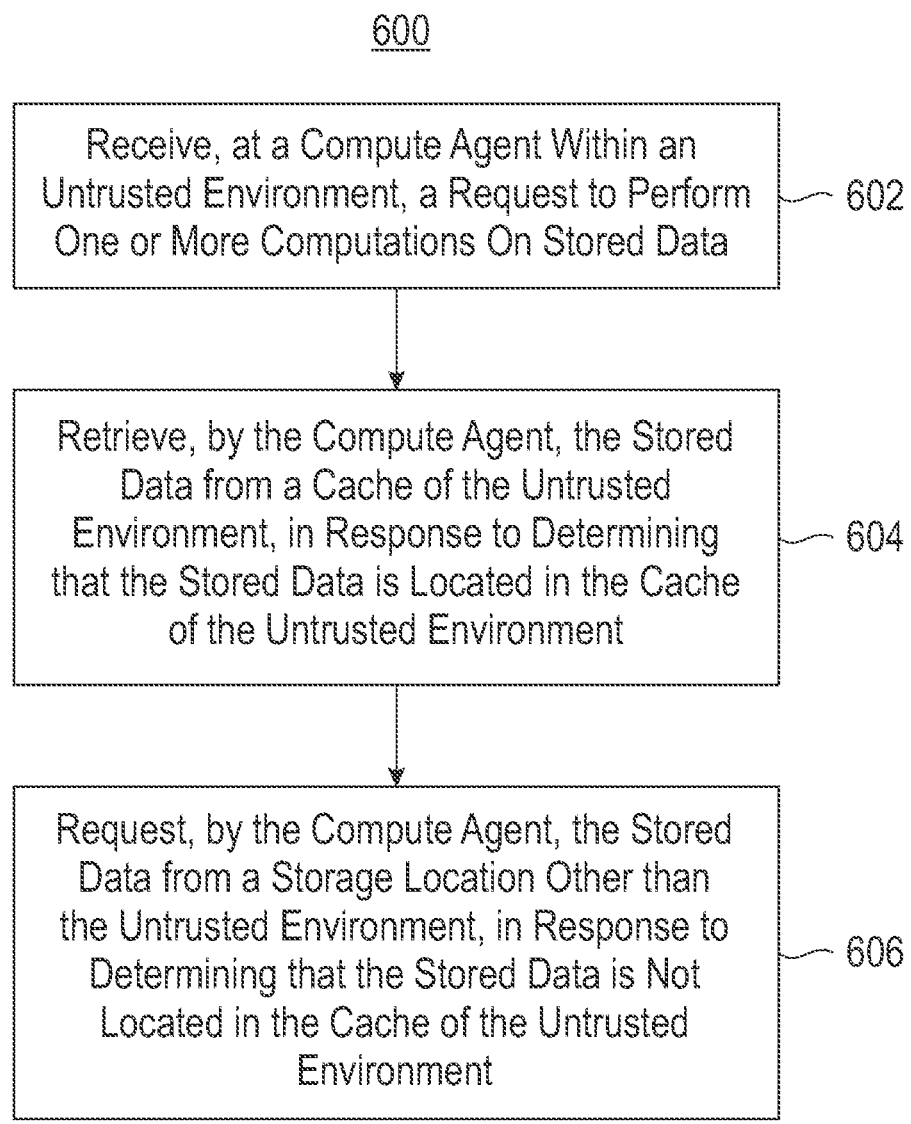
FIG. 6 illustrates a flowchart of a method for managing a request for data at a compute agent, in accordance with one embodiment.

Now referring to FIG. 6, a flowchart of a method 600 for managing a request for data at a compute agent is shown, according to one embodiment. The method 600 may be performed in accordance with the present invention in any of the environments depicted in FIGS. 1-4 and 9, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request to perform one or more computations on stored data is received at a compute agent within an untrusted environment. In one embodiment, the untrusted environment may include an untrusted node of an untrusted clustered computing environment, etc. In another embodiment, the compute agent may run a local service that exposes a compute interface.

For example, the compute interface may be used by one or more users to request one or more computations to be performed on stored data. In another example, the compute interface may limit the computations that can be performed. For instance, the computations may be limited to predetermined computations (e.g., summations, averages, predefined iterative functions, etc.). This may prevent the submission of arbitrary algorithms that interfere with a security of the processing of the data.

Additionally, in one embodiment, the request may be in the form of "agent.apply('xi', f)," where xi represents the stored data, and f represents the function to be applied to the stored data.

Further, method 600 may proceed with operation 604, where the stored data is retrieved by the compute agent from a cache of the untrusted environment, in response to determining that the stored data is located in the cache of the untrusted environment. In one embodiment, the stored data may be encrypted.

Further still, method 600 may proceed with operation 606, where the stored data is requested by the compute agent from a storage location other than the untrusted environment, in response to determining that the stored data is not located in the cache of the untrusted environment. In one embodiment, requesting the stored data may include sending a request for the stored data to a storage agent of the storage location. In another embodiment, the request may include an indication of a method by which the data will be processed (e.g., CPU processing, GPU processing, etc.). In yet another embodiment, the request may be encrypted before being sent to the storage agent.

Also, in one embodiment, a security budget of a requesting user may be adjusted, based on a type of processing requested by the user. For example, the user may request that secure computations be performed on the data. In another example, the user may request that differential privacy be applied during the secure computations. In yet another example, the security budget of the user may be reduced by a lower amount when the user requests secure computations and an application of differential privacy (when compared to a user request for non-secure computations and/or computations that do not apply differential privacy, etc.).

Figure 7:
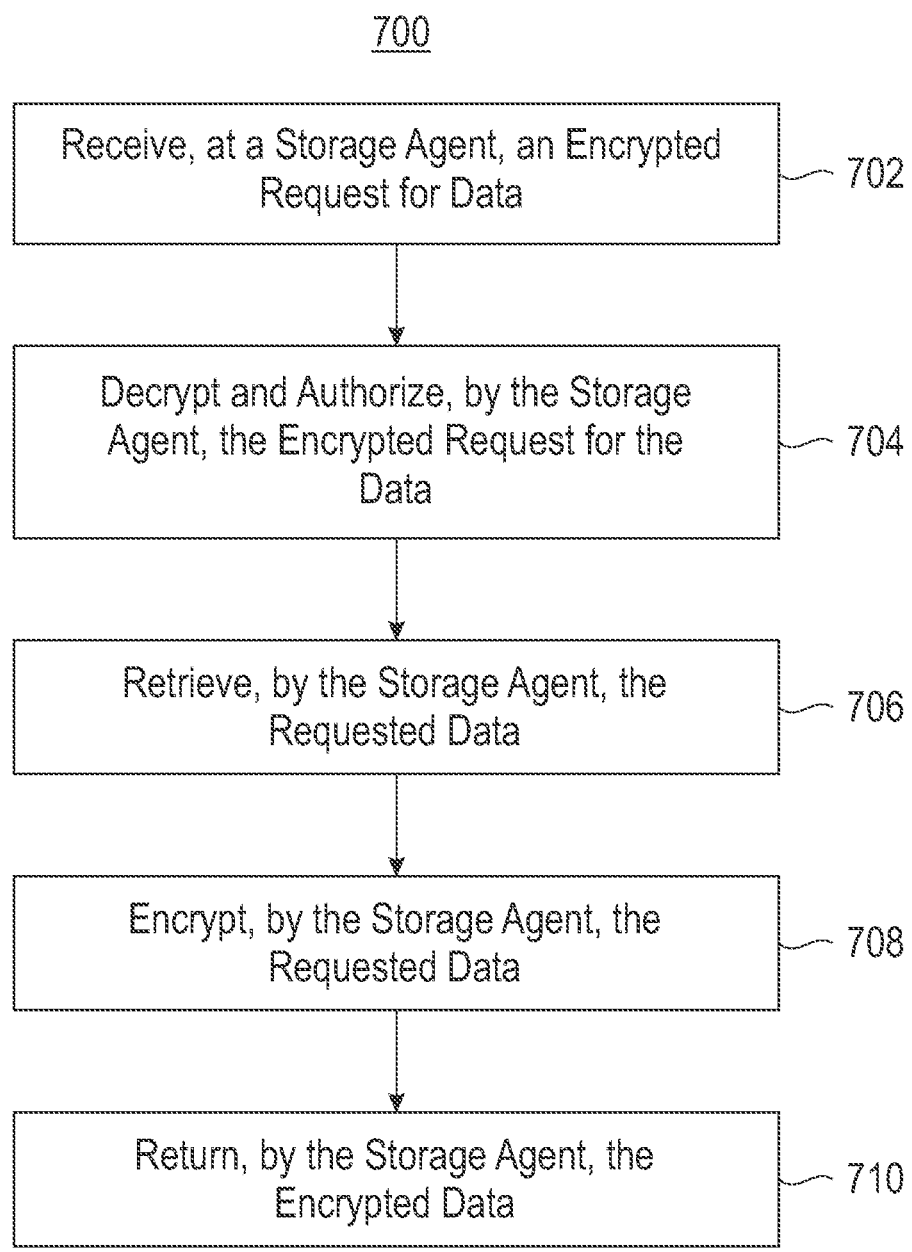
FIG. 7 illustrates a flowchart of a method for implementing a storage agent, in accordance with one embodiment.

Now referring to FIG. 7, a flowchart of a method 700 for implementing a storage agent is shown, according to one embodiment. The method 700 may be performed in accordance with the present invention in any of the environments depicted in FIGS. 1-4 and 9, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where an encrypted request for data is received at a storage agent. In one embodiment, the request for data may include an indication of a method by which the data will be processed. For example, the request may include an indication that the data will be processed utilizing a CPU enclave, utilizing a GPU with homomorphic encryption, etc. In another embodiment, the storage agent may be located at a storage location. In yet another embodiment, the data may be requested from the storage location. In still another embodiment, the request may be received from a compute agent located at an untrusted environment.

Additionally, method 700 may proceed with operation 704, where the encrypted request for the data is decrypted and authorized by the storage agent. In one embodiment, authorizing the request may include verifying that the request originated from a trusted enclave. In another embodiment, authorizing the request may include verifying that the request originated from a trusted compute agent.

Further, method 700 may proceed with operation 706, where the requested data is retrieved by the storage agent. Further still, method 700 may proceed with operation 708, where the requested data is encrypted by the storage agent. In one embodiment, the data may be loaded locally (e.g., at the storage location. In another embodiment, an encryption method may be selected and used to encrypt the data, based on the method by which the data will be processed. For example, if the request indicates that the data is to be processed by a CPU (e.g., within a CPU enclave), the data may be encrypted using a shared key generated by the enclave (e.g., during the remote attestation, etc.). In another example, if the request indicates that the data is to be processed by a GPU (e.g., utilizing homomorphic encryption), the data may be encrypted using homomorphic encryption.

Further still, method 700 may proceed with operation 710, where the encrypted data is returned by the storage agent. In one embodiment, the encrypted data may be returned to the requesting entity (e.g., the compute agent located at an untrusted environment). In this way, a security of requested data may be ensured when the data is sent from a data storage location to an untrusted environment for processing.

Figure 8:
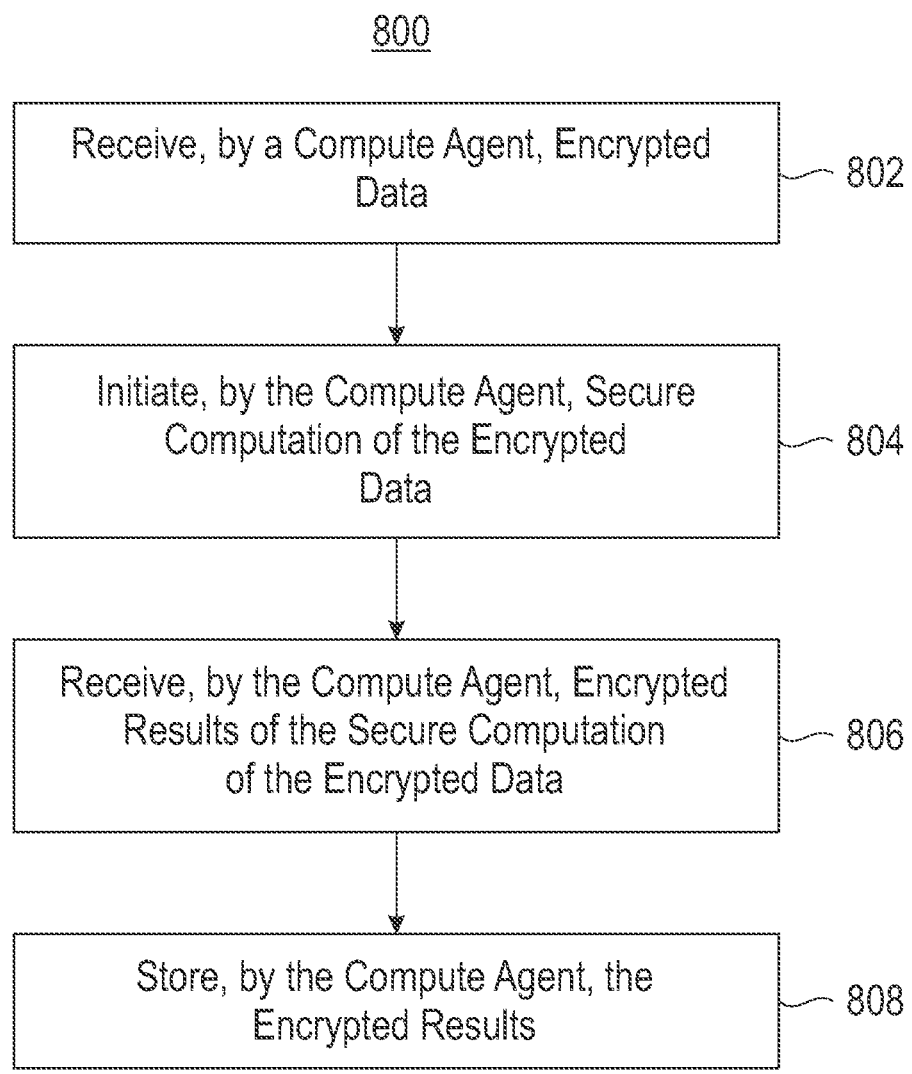
FIG. 8 illustrates a flowchart of a method for implementing secure computation by a compute agent, in accordance with one embodiment.

Now referring to FIG. 8, a flowchart of a method 800 for implementing secure computation by a compute agent is shown, according to one embodiment. The method 800 may be performed in accordance with the present invention in any of the environments depicted in FIGS. 1-4 and 9, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where encrypted data is received by a compute agent. In one embodiment, the encrypted data may be received from a storage agent located at a storage location. In another embodiment, the encrypted data may be received at an untrusted environment where the compute agent is located. In yet another embodiment, the encrypted data may be received by the compute agent in response to a request for the data by the compute agent.

Additionally, method 800 may proceed with operation 804, where secure computation of the encrypted data is initiated by the compute agent. In one embodiment, initiating the secure computation of the encrypted data may include determining whether a CPU or GPU of the untrusted environment will be used to perform the secure computation. For example, this determination may be selected by a user. In another example, this determination may be determined based on a configuration of a learning framework.

Further, in one embodiment, initiating the secure computation of the encrypted data may include preparing a CPU enclave within the untrusted environment, and passing the encrypted data to the CPU enclave for processing. For example, the CPU enclave may decrypt the encrypted data once the encrypted data is within the enclave. For instance, the data may be encrypted using a shared key generated by the enclave.

In another example, the CPU enclave may them perform the requested computations on the decrypted data. For instance, the requested computations may include computations requested by a user to be performed on the data. In yet another example, the CPU enclave may then encrypt results of performing the requested computations and return the encrypted results to the compute agent.

Further still, in one embodiment, initiating the secure computation of the encrypted data may include preparing a GPU kernel within the untrusted environment, and passing the encrypted data to the GPU kernel for processing. For example, the compute agent may initiate an execution of a kernel in the GPU. In another example, the encrypted data may be sent to the GPU. For instance, the data may be encrypted utilizing homomorphic encryption.

In another example, the GPU may them perform the requested computations on the encrypted data, utilizing one or more homomorphic encryption processing techniques. For instance, the requested computations may include computations requested by a user to be performed on the data. In yet another example, the GPU may then return the results of performing the requested computations to the compute agent, where the results are encrypted utilizing homomorphic encryption. In still another example, the GPU may be used for performing the secure computation in response to determining that a CPU enclave is unavailable and/or the requested computation requires a GPU.

Also, in one embodiment, a first portion of the secure computation may be performed utilizing the CPU (e.g., utilizing a CPU enclave, etc.), and a second portion of the secure computation may be performed utilizing the GPU (e.g., utilizing homomorphic encryption, etc.). In another embodiment, differential privacy may be applied continuously to the data during the secure computation. For example, noise may be applied once to a single output (or multiple times to each of a plurality of recurring outputs) of the performance of the requested computations on the decrypted data within the CPU enclave. In yet another embodiment, the compute agent may confirm that the secure computation is within a security budget of the user before proceeding with the secure computation.

In addition, method 800 may proceed with operation 806, where encrypted results of the secure computation of the encrypted data are received by the compute agent. In one embodiment, the results may be received from the CPU and/or GPU. In another embodiment, the results may have differential privacy applied (e.g., the results may have noise added, etc.).

Furthermore, method 800 may proceed with operation 808, where the encrypted results are stored by the compute agent. In one embodiment, the results may be stored in DRAM (e.g., in response to the CPU enclave performing the requested computations). In another embodiment, the results may be stored in shared RAM (e.g., in response to the GPU performing the requested computations).

Further still, in one embodiment, the secure computation of the encrypted data may be performed utilizing a first configuration. For example, the compute agent may change the first configuration to a second configuration and may initiate secure computation of the encrypted data utilizing the second configuration. In another example, each configuration may include one or more computations that are different from the other configurations. In yet another example, each configuration may have an order of computations that is different from the other configurations. In still another embodiment, the compute agent may confirm that the computations are within a security budget of the user before proceeding.

In this way, the compute agent may facilitate the processing of data utilizing multiple different configurations, while ensuring the security of the data being processed.

Also, in one embodiment, the compute agent may also decrypt the encrypted results in response to a request from a user. For example, a security budget of the requesting user may be reduced in response to the decryption. In another embodiment, the compute agent may train and test a variety of configurations of one or more machine learning algorithms via the secure computation of the encrypted data and may select and store a configuration that is determined to have the highest accuracy of all tested configurations. In yet another embodiment, the compute agent may only allow user access to outputs of the configuration that is determined to have the highest accuracy and/or an accuracy score of the configuration that is determined to have the highest accuracy.

Security Budget

In one embodiment, a user/analyst may have a predetermined security budget that is associated with an allowed amount of data access within a system. For example, every time an analyst receives an unencrypted outcome of data computation within the system, they spend part of their security budget.

Since the data on which computations are being performed is encrypted upon receipt, is securely contained while computations are performed, and is encrypted after computations are performed, and the computation output is unreadable without decrypting, an analyst may not need to consume their security budget (e.g., to perform testing on a generated model, to find an optimal model configuration, etc.).

Additionally, accuracy of the tests can be reported while the data itself is obfuscated (differentially private), so an additional privacy cost is minimal, or only one ("best") model may be returned. At that point the analyst may pay the (privacy) cost of a single "run." Further, the system may encrypt and store the optimal configuration for future use.

Further still, in one embodiment, the output may only be decrypted by the system where the computations are performed. Once decrypted, the output may be encrypted by an analyst key so other users do not use output (if not desired). Output may also be decrypted and delivered to the analyst.

In this way, a secure environment may be created in an otherwise untrusted cluster that ensures outputs are differentially private and data stays encrypted or protected at all times.

Figure 9:
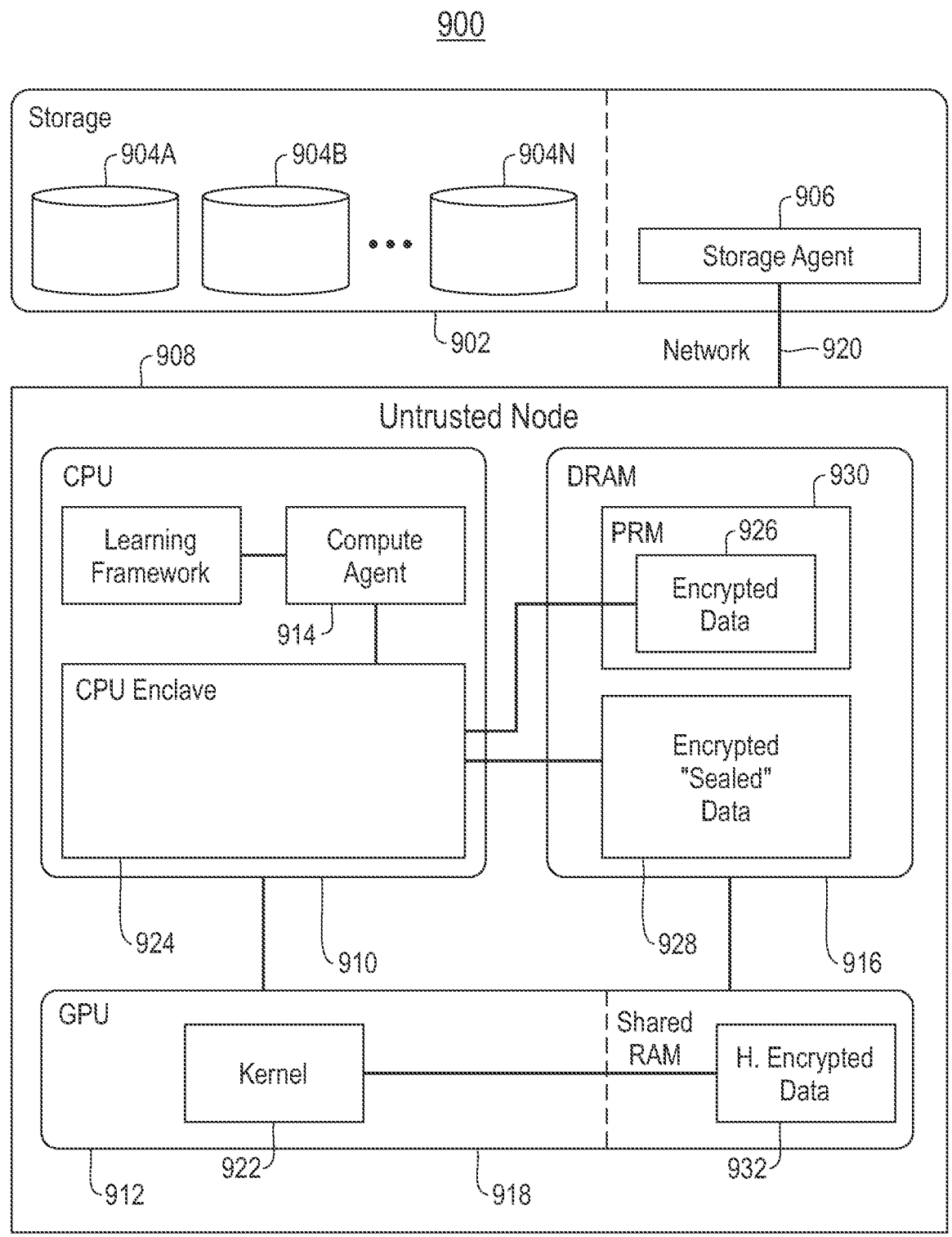
FIG. 9 illustrates an exemplary secured data processing architecture, in accordance with one embodiment.

FIG. 9 illustrates an exemplary secured data processing architecture 900, according to one exemplary embodiment. As shown, a storage location 902 includes a plurality of storage devices 904A-N, as well as a storage agent 906. Each of the plurality of storage devices 904A-N may include one or more hard disk drives, one or more solid state drives, one or more tape drives, one or more flash memory devices, one or more cloud storage devices, etc. Additionally, an untrusted node 908 in communication with the storage location 902 via a network connection 920 includes a central processing unit (CPU) 910, a graphics processing unit (GPU) 912, and a compute agent 914.

In one embodiment, the compute agent 914 may receive a request from a user, analyst, learning framework, etc. to perform one or more computations on data. In response, the compute agent 914 may first search dynamic random-access memory (DRAM) 916 and shared random-access memory (RAM) 918 within the untrusted node 908 to see if the data is stored locally. If the compute agent 914 finds the data within the DRAM 916 or shared RAM 918, the compute agent may initiate the one or more computations on the data.

However, if the compute agent 914 does not find the data within the DRAM 916 or shared RAM 918, the compute agent 914 may request the stored data from the storage location 902. For example, the compute agent 914 may include an indication of a method by which the data will be processed in a request, encrypt the request, and send the encrypted request to the storage agent 906.

Additionally, in one embodiment, in response to receiving the encrypted request, the storage agent 906 may decrypt and authorize the request. Once the request is decrypted and authorized, the storage agent 906 may retrieve the data from one or more of the plurality of storage devices 904A-N. The storage agent 906 may then encrypt the retrieved data, based on the method by which the data will be processed, and return the encrypted data to the compute agent 914.

Further, in one embodiment, upon receiving the encrypted data, the compute agent 914 may initiate secure computation of the encrypted data by one or more of the CPU 910 and GPU 912. For example, the compute agent 914 may prepare a kernel 922 of the GPU 912, and pass one or more portions of the encrypted data to the kernel 922 for processing (e.g., utilizing homomorphic encryption, etc.). In another example, the compute agent 914 may prepare a CPU enclave 924 within the CPU 910 and may pass one or more portions of the encrypted data to the CPU enclave 924 for processing (e.g., within the CPU enclave 924, etc.).

Further still, in one embodiment, results of secure computation of the encrypted data by one or more of the CPU 910 and GPU 912 may be stored in one or more of the DRAM 916 or shared RAM 918. For example, results of secure computation of the encrypted data by the CPU 910 may be stored as encrypted data 926 within hardware protected memory such as processor reserved memory PRM 930 of the DRAM 916 and/or as encrypted "sealed" data 928 within the DRAM 916. In another example, results of secure computation of the encrypted data by the GPU 912 may be stored as homomorphically encrypted data 932 within the shared RAM 918 contained within the GPU 912.

Also, in one embodiment, the results of secure computation of the encrypted data may be decrypted and provided to the user, analyst, learning framework, etc.

In this way, data security may be maintained during the retrieval of data from the storage location 902, during processing of the data by the CPU 910 and/or GPU 912, and during storage of the processing results in one or more of the DRAM 916 or shared RAM 918 at the untrusted node 908. More specifically, the storage agent 906 may preprocess, encrypt, and transfer requested data to the compute agent 914. The compute agent 914 may be placed in the untrusted node 908 in order to implement secure, differentially private computation of data.

Additionally, the compute agent 914 may act as an intermediary for data access by the user, analyst, learning framework, etc., such that direct data access by the user, analyst, learning framework, etc. may be prevented. The compute agent 914 may load encrypted data from the storage location 902 and may set up a secure environment for computation involving any unencrypted data.

In this way, differential privacy (or another definition of privacy) may be enforced within an untrusted server. Additionally, a DP interface may be provided to train and test models over a space of configurations with no additional security budget cost. For example, previous costs may be: "#configurations*privacy_cost_of_output," because output is readable. However, the aforementioned techniques may allow for a privacy cost of: "privacy_cost_of_output" because outputs may be guaranteed to be unreadable, besides any selected output that is returned to the user. The system may also encrypt and store the optimal configuration.

Overview

We propose the enforcement of differentially-private methods for analytics when accessing sensitive data in untrusted infrastructure. In one embodiment, our system creates a secure environment, in an otherwise untrusted cluster, that keeps data encrypted or protected at all times and additionally ensures outputs are differentially private. Computation requiring data access happens through an interface that provides privacy-aware routines, instead of allowing applications to have direct data access. Through this approach we ensure, first, that data is never accessed by untrusted users, and second, that any computation output is differentially private.

Specifically, in one embodiment, our approach places agents on the trusted storage system and the untrusted compute system. The compute agent loads encrypted data from storage and exposes an interface to be used by analytics frameworks for model training and inferencing. The agent contains common privacy-aware machine learning routines so that existing frameworks only delegate the core of the learning, which uses sensitive data, while leaving the rest of the framework untouched. The compute agent protects the data by utilizing a secure enclave or by leaving it encrypted and processing it through homomorphic encryption when a CPU enclave is unavailable or the computation requires a GPU.

Existing systems around secure computation and analytics consider the problem of running applications on untrusted infrastructure. A direction of research is protecting the execution and input data by placing them in an enclave. Our system uses an enclave as well, however, it also protects the output in the differentially-private sense. Specifically, by using enclaves we enforce that analytics on sensitive data happens through predefined privacy-aware routines so that outputs do not leak information. That is, in addition to keeping raw data secure, we guarantee that any processing on the raw data leads to privacy-aware outputs. Guaranteeing a level of privacy on the output is critical as outputs such as trained models may need to be shared with untrusted third parties, including the public.

As a bonus, our system enables scientists to evaluate their model without having access to the actual inferences so as to not consume their security budget. Because of the system's security we can enforce the scientist is not able to view the inferences if that is desired.

Differential Privacy

Differential privacy (DP) includes a mathematical definition of privacy. Differential privacy may require that a randomized function applied on nearly identical inputs yields nearly identical output distributions. Additionally, whether an individual's record is part of the dataset (or not), the output may remain almost identical, and hence the privacy of that individual may be maintained.

In one embodiment, for each DP algorithm output, an analyst may pay from their "security budget." The amount paid may depend on the algorithm and input data properties. In another embodiment, algorithms such as stochastic gradient descent, linear regression, clustering, etc. have been modified and proven to be differentially private. For example, differentially private functions may obfuscate computation (e.g., through Gaussian or Laplacian noise, etc.).

Secure Enclaves

In one embodiment, instructions may enable applications to create trusted environments known as enclaves (SE) within a CPU. For example, secure guard extensions may reserve part of the DRAM memory (e.g., PRM). Each enclave may allocate its cache, known as an Enclave Page Cache (EPC). Each enclave may have access to its pages in the EPC. The PRM may be inaccessible by privileged software, including the kernel and hypervisor, and direct memory access may be disabled. In another embodiment, data may be decrypted once in the CPU enclave, and may be encrypted when outside of the CPU enclave.

In another embodiment, instructions may enable applications to create trusted environments known as enclaves. This may be used to enforce the use of differentially privacy algorithms by the analytics framework. It creates a secure wall between the application and the data while maintaining developer flexibility. In particular, developers may continue using their analytics framework with few modifications to use the interface, which ensures the raw data remains unexamined and the outputs differentially-private. In addition, the system may keep the interface call outputs encrypted depending on the configuration.

Homomorphic Encryption

Homomorphic encryption (HE) includes a method for encrypting data while retaining the ability to perform computations on that data. Leveled HE may reduce an overhead and may assume that a depth of computation is known ahead of time.

Additionally, encryption parameters may be further optimized by knowing input characteristics. Optimizations for neural networks may be based on leveled HE and may result in fast inference. The use of GPUs may further improve performance. In one embodiment, homomorphic encryption optimized for a neural net use case. HE may be used to encrypt data when we lack SE support or need to use the GPU for deep learning applications. The output of homomorphic encryption computations may require a private key to be decrypted. The system may perform HE computations that include obfuscation and hence the decrypted output preserves privacy.

Homomorphic encryption allows us to protect the data, however, the computation could still be altered maliciously. Verifiable computation is an area of research that aims to solve that problem, and there is a line of work specifically for homomorphic encryption.

Another approach would be to probabilistically verify computation by sampling and repeating computation within a secure enclave on the same server. Finally, it is possible to optimize verification methods for algorithms of our interest—in this case neural networks.

Privacy-Aware Machine Learning

Privacy Integrated Queries (PINQ) is a layer on top of Language-Integrated Query (LINQ), a data querying interface for .NET languages. PINQ adds differential-privacy capabilities for computing on privacy-sensitive data. PINQ is focused on differential privacy and does not take into account untrusted environments or arbitrary analytics frameworks. Research prototypes of differential privacy applications to machine learning implement privacy into the analytics engine, e.g., in Tensorflow. In that case, chunks of raw data are loaded from the storage onto the compute cluster, where privacy, i.e., noise, is added during the analysis or learning process. Unfortunately, providing users of the analytics engine read access to a piece of raw data means it could be examined in unintended ways, either maliciously or accidentally, so outputs might not be privacy-preserving. The usage of such algorithms may be enforced in an untrusted environment so outputs are differentially private.

Data owners care about the security of their data during all stages of its lifetime, starting from the raw data, to outputs of statistics and machine learning models based on that data. Information may leak at any point. Differential privacy aims to solve the data leakages once an output is generated, whereas enclaves can be used to prevent leakages during processing. A system may be provided to both protect data during processing, and ensure outputs maintain differential privacy by enforcing it within the enclave.

EXEMPLARY DETAILS

In one embodiment, we consider a storage system and an independent compute cluster, possibly belonging to another department or organization that may be untrusted. The compute cluster runs a learning framework and needs storage access to retrieve data while the data owner needs a guarantee that any computation on the data results in differentially private output. In addition, it is required that no unencrypted raw data may be readable by untrusted hardware at any point while on the compute cluster.

In one embodiment, our system places agents on the storage system and compute cluster, which establish a communication channel between the two parties. The compute agent provides an interface to the learning framework with common differentially private routines, and for initiating the secure computation of the requested routines on the CPU enclave or GPU. The storage agent is responsible for authorizing the request, encrypting and sending the requested data. In addition, the compute agent may ask the storage agent to obfuscate the data prior to encrypting by using a differentially private method.

Storage Agent

In one embodiment, the storage agent's main responsibility is preparing and sending data to the compute agent. The storage agent receives encrypted requests describing the required data and the method by which they will be processed so as to pick the right encryption method. Before taking action, the storage agent verifies the request originates from a trusted enclave. Once verified, the data is encrypted. For CPU based processing in an enclave, the data is encrypted using the corresponding enclave/hardware public key and encryption method, whereas for GPU processing (or other insecure processors) we use homomorphic encryption optimized based on the request and data. Once the data is encrypted it is transferred to the corresponding compute agent.

Compute Agent

In one embodiment, the compute agent is the link between the learning framework and the storage. The compute agent provides an interface for the framework to initiate computation, it communicates with the storage to retrieve the required data, and it prepares and manages the (secure) computation in the CPU enclave or GPU. The compute agent is split into three main components: an analytics interface, a data retrieval portion, and a secure computation portion.

Analytics Interface

In one embodiment, the agent runs a local service that exposes an application programming interface with functions designed to be used by the framework. The functions exposed are iterative differentially private versions of methods such as gradient descent, regression, and others, which are applied on raw data. The interface also includes non-iterative differentially private methods that may be applied on the input or output of the computation. If the obfuscation (to guarantee differentially private outputs) is to be applied on the input it can take place on the storage side before the encryption happens.

Data Retrieval

In one embodiment, the agent establishes a communication channel with the storage to retrieve data required by the learning framework. On arrival, the data is already encrypted and remains secure during the whole process, either by remaining encrypted or by being decrypted within the bounds of the enclave, i.e., in trusted hardware.

Secure Computation

In one embodiment, the agent prepares the CPU enclave or GPU kernel, or other insecure processing unit, and initiates the secure computation in the corresponding unit. The agent chooses between CPU and GPU (or other) implementations depending on the learning framework configuration. In the CPU case, the agent starts an enclave where it loads the analytics routines. The enclave takes care of decrypting the data (once in the enclave) and runs the requested routines on the decrypted data. If the computation requires a GPU the agents starts a kernel execution within the GPU. In that case, the data remains encrypted and is transferred to the GPU. The requested routines are executed using homomorphic encryption within the kernel (this is similar for other non-CPU processing units).

In one embodiment, the computation output may remain encrypted in the compute cluster to perform testing on the generated model (so the learning framework user does not consume security budget) or be decrypted and delivered to the framework user. The output can only be decrypted by our system. Once decrypted it may stay within the enclave and be encrypted using the user's public key to remain secure. By ensuring other users don't access the output, our system can maintain a valid security budget for the other users.

Example Embodiments

Example embodiments may include:
For cloud service: implementing a service allowing clients to perform analytics on sensitive data that provides end-to-end data protection (input/intermediate/output data).
For Mainframes: implementing a differentially private interface for machine learning computations within the mainframe. The mainframe already encrypts data as it leaves the system (acting as a large CPU enclave with all components of a compute node).

Exemplary Implementation

Consider a hospital collecting and administrating patient genomic data. A private lab specialized in genomic analysis would like to access the patient data for the benefit of the patients and to achieve wider research advances. The hospital would like to provide data access to the lab but is worried about it being misused or lost in that process. The lab presumably provides some guarantees that the data will be treated properly, and the hospital provides a copy of the data to the lab. The lab performs analytics on the data.

A malicious lab employee or intruder could manage to view, copy, or modify the data and/or the output. If the output is to be shared, there is no guarantee it might not leak information about individuals described in the input. Similarly, an attacker having access to the output, might be able to reconstruct parts of the input. If the outputs are to be shared broadly, the danger is even higher.

To prevent leaking information in the output the hospital could provide differentially private data to the lab. The problem in that case is the computation accuracy: to achieve DP solely by preparing the input data requires too much data obfuscation, which leads to lower accuracy for the analysis performed by the lab. We manage to enforce that obfuscation during the computation using the methods described above. That way the hospital can be assured its data is safe, the analysis outputs are differentially private, and the lab has the chance to perform the analysis successfully.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    obtaining, at an untrusted environment, encrypted data from a storage location;
    decrypting, within a trusted enclave of a central processing unit (CPU) of the untrusted environment, the encrypted data to obtain decrypted data;
    performing one or more operations on the decrypted data within the trusted enclave of the CPU;
    encrypting results of the one or more operations within the trusted enclave of the CPU; and
    providing, by the trusted enclave of the CPU within the untrusted environment, the encrypted results.

2. The computer-implemented method of claim 1, wherein the untrusted environment includes a node within an untrusted cluster of nodes specializing in performing data processing.

3. The computer-implemented method of claim 1, wherein the one or more operations include one or more analytics operations.

4. The computer-implemented method of claim 1, wherein performing one or more operations on the decrypted data within the trusted enclave of the CPU includes:
    training and testing multiple configurations of one or more machine learning algorithms, and
    selecting and storing a configuration that is determined to have the highest accuracy of all tested configurations;
    wherein user access is allowed only to:
        outputs of the configuration that is determined to have the highest accuracy of all tested configurations, and
        an accuracy score of the configuration that is determined to have the highest accuracy of all tested configurations.

5. The computer-implemented method of claim 1, further comprising selecting the trusted enclave of the CPU, instead of a graphics processing unit (GPU), to perform one or more secure computations on the encrypted data, where the selection is made based on a configuration of a learning framework.

6. The computer-implemented method of claim 1, wherein the results of the one or more operations are encrypted within the trusted enclave of the CPU utilizing a shared key generated by the enclave.

7. The computer-implemented method of claim 1, wherein the one or more operations are initiated by a compute agent implemented within the untrusted environment.

8. The computer-implemented method of claim 1, further comprising applying differential privacy during the one or more operations.

9. The computer-implemented method of claim 1, wherein:
    the decrypting of the encrypted data, the performing of one or more operations on the decrypted data, the encrypting of the results of the one or more operations, and the providing of the encrypted results is performed within the trusted enclave of the CPU in response to determining that a CPU of the untrusted environment will be used to perform secure computations on the encrypted data, and
    in response to determining that the trusted enclave of the CPU is unavailable:
        a graphics processing unit (GPU) kernel is prepared within the untrusted environment, and
        the encrypted data is passed to the GPU kernel for processing.

10. The computer-implemented method of claim 1, wherein the results are stored in random access memory (RAM) within the untrusted environment.

11. The computer-implemented method of claim 1, further comprising decrypting the results in response to a user request, wherein decrypting detracts from a security budget of the user.

12. The computer-implemented method of claim 11, wherein noise is applied to an output of the performance of the one or more operations on the decrypted data within the trusted enclave of the CPU.

13. The computer-implemented method of claim 1, wherein:
    the decrypting of the encrypted data, the performing of one or more operations on the decrypted data, the encrypting of the results of the one or more operations, and the providing of the encrypted results is performed within the trusted enclave of the CPU in response to determining that the CPU of the untrusted environment will be used to perform secure computations on the encrypted data, and
    in response to determining that the trusted enclave of the CPU is unavailable:
        the encrypted data is passed to a GPU kernel for processing.

14. The computer-implemented method of claim 1, wherein performing one or more operations on the decrypted data within the trusted enclave of the CPU includes:
    selecting a configuration of a machine learning algorithm that is determined to have the highest accuracy of a plurality of configurations of one or more machine learning algorithms;
    wherein user access is allowed to:
        outputs of the configuration that is determined to have the highest accuracy of all configurations.

15. A computer program product comprising one or more computer readable storage media, and program instructions collectively stored on the one or more computer readable storage media, the program instructions comprising instructions configured to cause one or more processors to perform a method comprising:
    obtaining, by the one or more processors at an untrusted environment, encrypted data from a storage location;
    decrypting, by the one or more processors within a trusted enclave of a central processing unit (CPU) of the untrusted environment, the encrypted data to obtain decrypted data;
    performing, by the one or more processors, one or more operations on the decrypted data within the trusted enclave of the CPU;
    encrypting, by the one or more processors, results of the one or more operations within the trusted enclave of the CPU; and
    providing, by the one or more processors via the trusted enclave of the CPU within the untrusted environment, the encrypted results.

16. The computer program product of claim 15, wherein the untrusted environment includes a node within an untrusted cluster of nodes specializing in performing data processing.

17. The computer program product of claim 15, wherein the one or more operations include one or more analytics operations.

18. The computer program product of claim 15, wherein performing one or more operations on the decrypted data within the trusted enclave of the CPU includes:
   training and testing multiple configurations of one or more machine learning algorithms, and
   selecting and storing a configuration that is determined to have the highest accuracy of all tested configurations;
wherein user access is allowed only to:
   outputs of the configuration that is determined to have the highest accuracy of all tested configurations, and
   an accuracy score of the configuration that is determined to have the highest accuracy of all tested configurations.

19. The computer program product of claim 15, further comprising selecting, by the one or more processors, the trusted enclave of the CPU, instead of a graphics processing unit (GPU), to perform one or more secure computations on the encrypted data, where the selection is made based on a configuration of a learning framework.

20. A computer-implemented method, comprising:
   obtaining, at an untrusted environment, encrypted data from a storage location;
   in response to determining that a central processing unit (CPU) of the untrusted environment will be used to perform secure computations on the encrypted data:
      decrypting, within a trusted enclave of the CPU of the untrusted environment, the encrypted data to obtain decrypted data,
      performing one or more operations on the decrypted data within the trusted enclave of the CPU,
      encrypting results of the one or more operations within the trusted enclave of the CPU, and
      providing, by the trusted enclave of the CPU within the untrusted environment, the encrypted results; and
   in response to determining that the trusted enclave of the CPU is unavailable:
      preparing a graphics processing unit (GPU) kernel within the untrusted environment, and
      passing the encrypted data to the GPU kernel for processing.

* * * * *